Feb. 1, 1966     P. L. BOATWRIGHT     3,232,007
SUBSOIL FERTILIZERS APPLICATOR

Filed March 30, 1964     3 Sheets-Sheet 1

INVENTOR.
PAUL L. BOATWRIGHT
BY John H. Widdowson
ATTORNEY

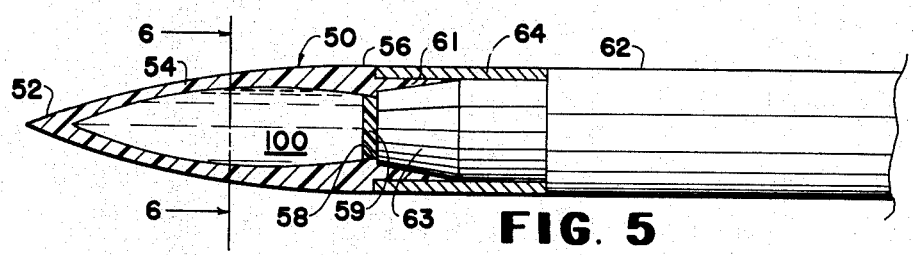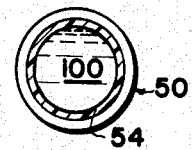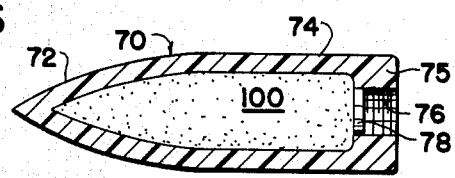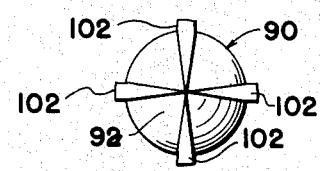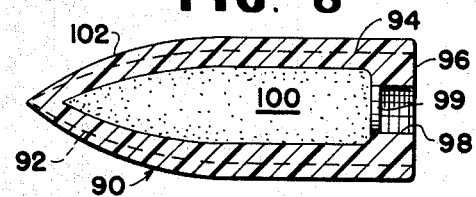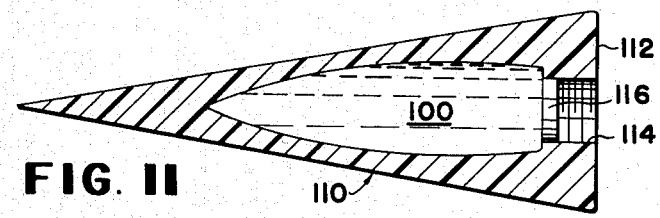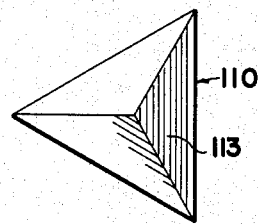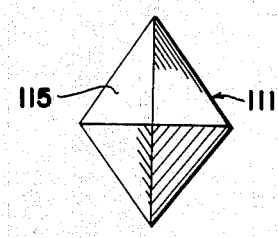

Feb. 1, 1966   P. L. BOATWRIGHT   3,232,007
SUBSOIL FERTILIZERS APPLICATOR
Filed March 30, 1964   3 Sheets-Sheet 3

INVENTOR.
PAUL L. BOATWRIGHT
BY John H. Widdowson
ATTORNEY

United States Patent Office 3,232,007
Patented Feb. 1, 1966

3,232,007
SUBSOIL FERTILIZERS APPLICATOR
Paul L. Boatwright, 4301 Huntoon, Topeka, Kans.
Filed Mar. 30, 1964, Ser. No. 355,657
5 Claims. (Cl. 47—48.5)

This invention relates to the dispensing of materials, more specifically the dispening of soil conditioners and the like to the soil. The invention relates to apparatus and methods for controllably dispensing and distributing soil conditioners and the like. More specifically the invention relates to the enclosing of a material to be dispensed in a water soluble protective means which is adapted to be forced into the soil. The material to be dispensed will remain protected in the protective means in the soil until the protective means is exposed to water, at which time the protective means will dissolve and the material will be dispensed.

Fertilizer cartridges with an amount of fertilizer or the like enclosed in a container adapted to be driven into the soil are old in the art. However these cartridges are formed of metal, plastics, or other relatively durable material. These cartridges ordinarily have slots or small openings to allow the material to leak out. The metal plastic, etc. of the cartridge being relatively durable remained in the soil for relatively long periods. They often caused personal injury to the persons working in the soil or injury to children, etc. when the cartridges inadvertently worked their way to the surface. The cartridges often provide sharp and jagged edges which when stepped on or otherwise came in contact with an unprotected limb, foot, hand or the like, cause severe lacerations. Further the cartridge elements are unsightly when the soil is turned or otherwise worked. The working of the soil often necessitates an additional operation of gathering the cartridges and disposing of same. Often the materials in the casing or cartridges have a toxic effect on the soil. The cartridge elements known to the prior art do not in general provide a suitable method of controllably dispensing a fertilizer or other material in the soil in desirable amounts, which dispensing can be extended over relatively long periods of time and at desirable times when the soil is damp. Application of too large amounts of fertilizer during a dry period to living plants results in damage and often subsequently destruction of the plants.

Cartridges are known that are made of cardboard and other less durable but permeable material. These cartridges are adapted to dispense the material with a greater degree of control than the aforementioned type of cartridge. However, if the materials of the cartridge are sufficiently porous to allow a slow leaching of the fertilizer therethrough they are too soft and pliable. Conversely, if the material is sufficiently strong to withstand the abuse, it is usually too impervious. The greatest objection to this type of cartridge is that it lacked the necessary strength and stability to allow it to be driven or forced into the ground, particularly if the ground were packed, of clay, stones, gravel or the like. This severely limits the practical application of the cartridge.

Still another type of cartridge known to the prior art consists of a hollow wooden stake or cartridge having fertilizer or the like disposed within. The advantage of this cartridge is that it is relatively strong adapting it to be driven into the ground. It will also decay within a reasonable period of time. However, this type of cartridge does not provide a suitable means of slowly dispensing soil conditioning material. The material often remains in the cartridge for long periods of time until it decays which ordinarily is objectionable because the periods are of extended length. Further, this type of cartridge is expensive to produce. A more serious objection to this type of cartridge is that it provides a harbour for termites and other objectionable insects. This, in certain areas of the country subject to termites, presents a very serious hazard. There is a relatively great need for a simple inexpensive dispensing means adapted to be driven into the ground or soil which will controllably dispense fertilizer or other material, without the disadvantages associated to the presently known dispensing device and apparatus.

I have invented a new soil conditioning dispensing means. My dispensing means is a pellet having therein soil conditioning material to be dispensed. A water soluble material encloses the soil conditioning material to be dispensed. The soil conditioning dispensing means of my invention in use is adapted to be placed into the soil or the like and release the soil conditioning material upon exposure to moisture.

My new method of dispensing soil conditioning material involves enclosing material to be dispensed in a pellet of a material soluble in water, inserting the pellet into the soil or the like, and causing the pellet to dissolve thereby releasing the material contained therein.

The new dispensing means and method of my invention solves all the problems associated with analogous apparatus and methods known to the prior art. The dispensing means of my invention is simple and inexpensive to produce. The pellets can be molded quickly, efficiently, and inexpensively with modern molding apparatus.

The dispensing rate and time of dispensing can be simply and dependently controlled to suit the existing need. For example, the soluble material of the cartridge can be varied in nature to provide the desired degree of solubility. This is closely related to the rate at which it will dissolve. Thus by varying the solubility of material, the time that is required to dissolve the cartridge to release the material is controlled. Further, the time and rate can also be varied by selecting the thickness of the walls of the cartridge. The rate at which the material is dispensed can be varied by providing thinned portions in the cartridge that will dissolve before the main body to provide openings therein. The size of the openings can be controlled by proper design of the cartridge.

The cartridge capsules or pellets of the invention being made of soluble material will dissolve over a relatively short time depending upon the type, thickness, etc. of material, and will not present a hazard, or unsightly nuisance as in the case with cartridges known to the prior art. Further since the material will not harbour termites, insects, etc. it is very feasible for use in areas where termites, etc. are prevalent. The cartridges of the invention are very rigid and sturdy and are adapted to be driven or forced into ground that is relatively hard and packed. This is very important in firm or packed soil. Further, the cartridges since they are molded can be provided with suitable reinforcing ridges either inside, outside or both which serve to further strengthen the cartridge. The cartridges of the invention are also relatively easy to store.

An object of this invention is to provide a new soil conditioning dispensing means.

Another object of this invention is to provide a new method of dispensing material and the like in the soil.

Still another object of this invention is to provide a new cartridge means adapted to contain soil conditioning material having a water soluble construction thereof.

Another object of this invention is to provide a new soil conditioning apparatus that can be conveniently driven or forced into the ground and which will lose its identity in a relatively short time thereby eliminating the nuisance, danger, etc. of cartridges.

Yet another object of this invention is to provide a new type cartridge for conditioning soil that can be simply and easily and efficiently produced.

Another object of this invention is a method of soil conditioning wherein the rate of dispensing of the soil conditioning material can be closely and accurately controlled.

Still another object of this invention is to provide an encapsulating means for soil conditioning material that is composed of a material that is not toxic to living plants and animals.

Still another object of this invention is to provide a soil conditioning means that is inexpensive to produce.

Still another object of this invention is to provide an encapsulating means for soil conditioning material that has a texturing effect on the soil upon dissolving therein.

Other objects and advantages of the invention will be apparent to those skilled in the art from the disclosure set forth herein.

Drawings of preferred specific embodiments of the invention accompany and are a part hereof, and such are to be understood to not unduly limit the scope of the invention. In the drawings, FIG. 1 is an elevational view, generally in vertical cross section showing portions of a tree both above and below the surface of the ground and the relative position of the soil conditioning means and insertion rod of my invention during the insertion procedure.

FIG. 5 is still another embodiment of my invention showing a longitudinal broken cross sectional view of the cartridge means coupled to an insertion means.

FIG. 6 is a cross sectional view taken on line 6—6 of FIG. 5.

FIG. 7 is an end view of another specific embodiment of the cartridge of my invention.

FIG. 8 is a longitudinal view in cross section of the embodiment depicted in FIG. 7.

FIG. 9 is still another embodiment of the novel cartridge means of my invention illustrating an end view thereof.

FIG. 10 is a longitudinal view in cross section of the embodiment depicted in FIG. 9.

FIG. 11 is a longitudinal view in cross section of still another embodiment of the cartridge means of my invention.

FIG. 12 is an end view of the cartridge means embodiment depicted in FIG. 11.

FIG. 13 is an end view of still another specific embodiment of a cartridge means of my invention similar to the embodiment of FIG. 12 showing a modified cross section thereof.

FIG. 14A is a transverse cross sectional view of still another embodiment illustrated showing reinforcing ridges disposed within the cartridge.

Figure 1:
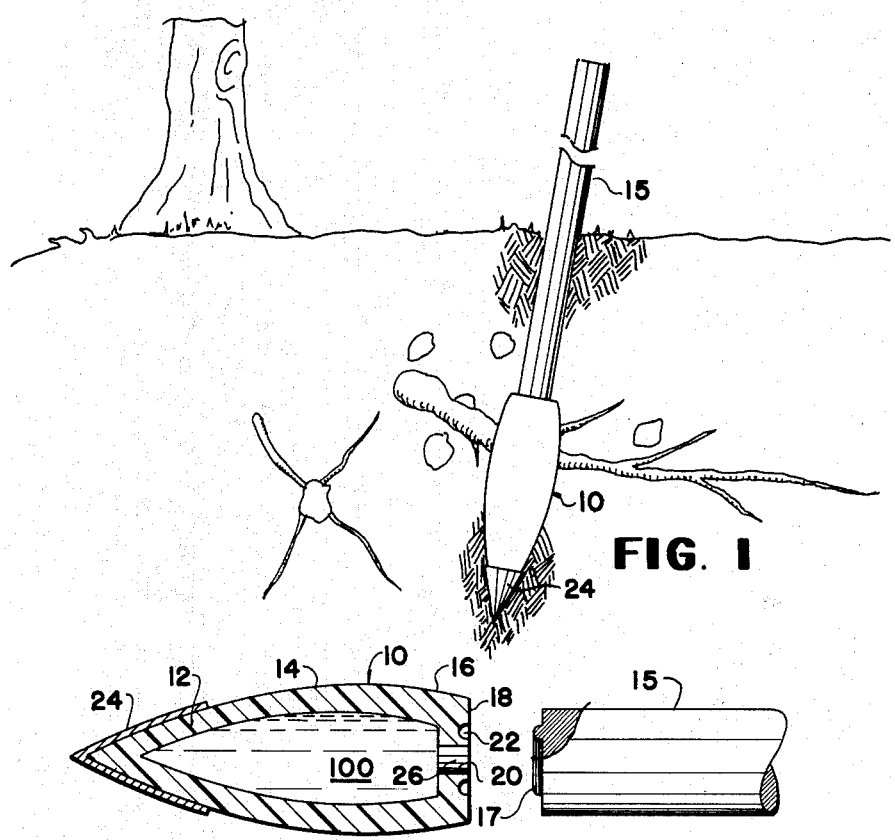

The following is a discussion and description of the new soil conditioning means and method of my invention made with reference to the drawings, wherein the same reference numerals are used to indiate the same or similar parts and/or structure. The discussion and description are of preferred specific embodiments of the new soil conditioning means and method of my invention, and it is to be understood that such are not to unduly limit the scope of my invention.

Figure 2:
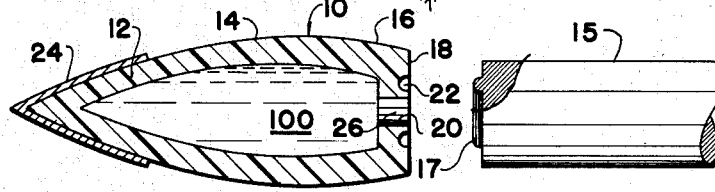
FIG. 2 is a longitudinal view showing a specific embodiment of my new soil conditioning cartridge means in cross section and an insertion rod in broken cross section.

Referring now to FIGS. 1–18 of the drawings, and in particular to FIGS. 1 and 2, which show a preferred specific embodiment of my invention, namely a sub-soil fertilizer applicator 10 to controllably dispense fertilizer. The fertilizer application 10 is a hollow water soluble longitudinally symmetrical capsular container of polyvinyl alcohol resin. Polyvinyl alcohol is a water soluble resin made by the hydrolysis of polyvinyl acetate. The physical properties of polyvinyl alcohol vary according to the molecular weight of the parent polyvinyl acetate and the extent of hydrolysis. The structure of polyvinyl alcohol obtained by complete hydrolysis can be represented by $-CH_2-CHOH(CH_2CHOH)_n-$ where $n$ is related to the molecular weight of the parent resin. On partial hydrolysis proportional amounts of residual $CH_3COO-$ groups are distributed along in place of the hydroxyl ion, and the amount of such acetate groups expressed as a percentage is the acetate content. For example, in a polyvinyl alcohol of 70 percent acetate content, 30 percent of the acetate groups of the original polyvinyl acetate are hydrolized to hydroxyl groups, and the 70 percent remain as acetate groups. In commercial polyvinyl alcohol, the expression "low acetate" covers range up to 15 percent, "medium acetate" 15 to 45 percent, and "high acetate" over 45 percent. In general in water at 20 degrees C., polyvinyl alcohol of up to 10 percent acetate content will swell, 10 to 38 percent is soluble, 38 to 75 percent forms a thin mobile gell, and the higher content is insoluble. Thus, stated another way polyvinyl alcohol resin produced by the hydrolysis of polyvinyl acetate in which the hydrolysis is 25 to 100 percent complete is directly affected by water. These ranges are very general and variance of the molecular weight of the parent vinyl acetate will also change the characteristics. I have found that polyvinyl alcohol resin produced by the hydrolysis of polyvinyl acetate, which hydrolysis is in the range of 25 to 100 percent is preferred. Most preferred is a polyvinyl alcohol resin which the hydrolysis is in the range of 62 to 90 percent complete. Further, I have discovered that polyvinyl alcohol resin when it dissolves has a texturing effect on the soil which is beneficial.

Preferably, the polyvinyl alcohol material is reinforced with a filler material, the filler material in combination with polyvinyl alcohol resin will produce a stronger, more firm material mixture than polyvinyl alcohol resin alone, the filler material can be any suitable material, either organic or inorganic. Examples of suitable fillers are carbon black, silica, titanium chloride, clay, asbestos, shredded cotton, etc. Also, certain soil conditioning compounds can be mixed directly with the polyvinyl alcohol to serve as filler material. Further, the polyvinyl alcohol can be combined with other suitable plastic resins that are compatible and do not destroy the water solubility characteristics. Rigid materials can also be embedded in the polyvinyl alcohol resin to strengthen same.

The fertilizer applicator 10 has a conical shaped forward end portion 12, a slightly bulged central portion 14 and a rear portion 16 having a progressively decreasing diameter. Fertilizer application 10 also has a flat rear surface 18 having a central aperture 20 and a concentrically positioned annular depression 22. A hollow conical shaped steel tip 24 is disposed over the forward end portion 12. The tip 24 is in general made of a very hard sturdy material which will enable the fertilizer applicator to penetrate the ground or soil. The tip 24 can be made of any suitable material as for example plastic, metal, ceramic, etc. A plug 26 is disposed in aperture 20 in frictional engagement therewith. A water soluble fertilizer 100 is disposed within the capsular container. However any other suitable type of soil conditioning compound can be placed in the fertilizer applicator and introduced into the soil if necessary and desirable. For example, materials such as insecticide, iron filings, carbon black, lime, etc. can be placed in fertilizer applicator 10 and dispensed therewith.

In order to force the fertilizer applicator 10 into the soil an insertion rod 15 is provided. The insertion rod 15 can be made of any suitable material, as for example, wood, metal, plastic, etc. The insertion rod 15 has a means adapting it to be coupled to the fertilizer applicator. In this embodiment the coupling means is an annular shaped protrusion 17 which is complementary in shape to the annular depression 22 in the rear end surface 18 of the capsular container. Protrusion 17 and annular depression 22 are adapted to be coupled by a frictional locking engagement therebetween. In use the fertilizer applicator 10 is affixed to the rod 15 and forced into the sub-soil either by pushing, pounding or other methods. The capsular container 10 will subsequently dissolve upon coming in contact with moisture in the soil to thereby controllably dispense the ferilizer 100. The fertilizer applicator can be inserted in the soil even during dry periods where the fertilizer will remain encapsulated until the soil has been moistened either by irrigation or rain. The material of the fertilizer applicator can be varied making it more or less soluble to adapt it for varying requirements of different applications. Further, several types of fertilizer or other conditioning material can be combined to form a mixture. The various types used can have different physical properties, such as solubility. By combining a mixture of different solubilities the rate and duration of the dispensing can be controlled to extend over a long period of time.

Figure 3:
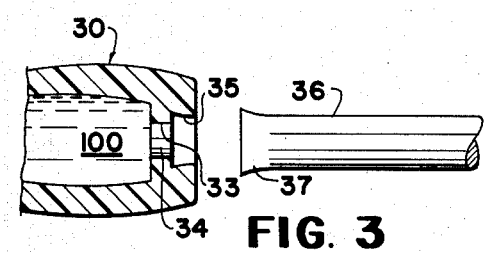
FIG. 3 is another specific embodiment of my invention showing a longitudinal cross sectional view of the cartridge means, and an insertion rod for use therewith.

In FIG. 3 is shown another specific embodiment of the soil conditioner means of my invention. In FIG. 3 is shown a capsular container 30 having a soil conditioning compound 100 therein. The shape of the capsular container 30 is generally the same as illustrated in FIGS. 1 and 2 in the drawings. However, the coupling means for coupling the capsular container to an insertion rod is different. There is provided in the capsular container an aperture 33 and a plug 34 for closing same. Also provided is a longitudinally extending frusto-conical shaped enlarged bore 35 concentric with aperture 33. An insertion rod 36 having a flared end portion 37 complementary in shape to bore 35 is provided. Flared end portion 37 and bore 35 cooperate to form a coupling means.

Figure 4:
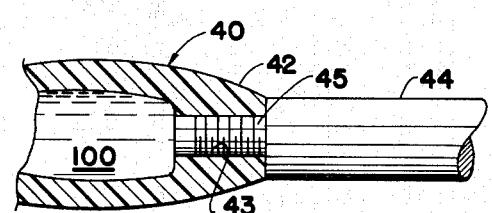
FIG. 4 is another embodiment of my new soil conditioning means shown in longitudinal cross section.

In FIG. 4 is shown still another specific embodiment of the soil conditioning apparatus of my invention. There is shown a capsular container 40 having a soil conditioning compound 100 therein. The capsular container 40 has a thickened rear wall portion 42 with a threaded central aperture 43. A rod 44 having a threaded protrusion adapted to releasably engage the threaded aperture 43 is provided. The rod 44 is coupled to capsular container 40 by screwing the threaded protrusion 45 in threaded aperture 43.

Still another specific embodiment of my soil conditioning means is illustrated in FIGS. 5 and 6. The soil conditioning means illustrated in a hollow water soluble capsular container 50, preferably of polyvinyl alcohol resin of the same type described in relation to the embodiment of FIG. 1. Capsular container 50 has a shape symmetrical about a longitudinal axis with a sharp forward end portion 52, a central portion 54 having a progressively increasing diameter, and a rear portion 56. A longitudinally extending aperture 58 having a plug 59 disposed therein seals in soil conditioning compound 100. The wall of the capsular container 50 is relatively thick in the forward portion 52 progressively becoming thinner in the central portion 54 and then progressively thicker in the rear portion 56. A longitudinally extending annular tapered projecting wall means 61 is provided on the rear portion of the capsular container. An insertion rod 62 having a longitudinally extending protrusion 63 thereon, complementary in shape to the interior of the projecting wall means 61, and a cylindrical sleeve 64 is disposed about same to engage the exterior surface of the projecting wall means 61. The protrusion and cylindrical sleeve are adapted to form a coupling means with the projecting wall means 61 on the capsular container. The capsular container 50 in use is adapted to be affixed to the insertion rod 62 and forced into the sub-soil to subsequently dissolve upon coming in contact with moisture.

Still another embodiment of this soil conditioning means of my invention is depicted in FIGS. 7 and 8 of the drawings. The embodiment consists of a hollow water soluble capsular container 70 of polyvinyl alcohol resin of the same general type and character described in the embodiment of FIGS. 1 and 2. The capsular container 70 has a shape symmetrical about the longitudinal axis with a wall having a relatively uniform thickness. It has a sharp pointed forward end 72 having a progressively increasing diameter, and a cylindrical shaped rear end portion 74 with a rear thickened end wall 75 transverse to the longitudinal axis. A threaded aperture 76 is disposed in rear wall 75, and a plug 78 disposed therein enclosing a soil conditioning compound 100 within the capsular container 70. The threaded aperture 76 is adapted to receive an insertion means having a threaded protrusion of the type depicted in FIG. 4. The capsular container is in use inserted into the soil to subsequently dissolve upon coming in contact with moisture.

FIGS. 9 and 10 illustrate still another specific embodiment of my soil conditioning means. The soil conditioning means has a hollow water soluble capsular container 90 having a pointed forward end portion 92 and a generally cylindrically shaped rear end portion 94 with a flat rear wall 96. A longitudinally extending threaded aperture 98 is disposed in the rear wall 96 having a plug 99 disposed therein enclosing soil conditioning compound 100. A plurality of longitudinally extending radially disposed fins 102 extend the entire length of the capsular container 90. The fins 102 strengthen the walls of the container 90 and also make the container directionally stable when it is being inserted in the soil. The capsular container 90 is adapted to be affixed to an insertion rod and forced into the soil in the manner heretofore described.

In FIGS. 11, 12 and 13 are depicted two preferred specific embodiments of the invention. The soil conditioning applicator is a hollow water soluble capsular container 110 having a rear wall 112 and a centrally disposed interiorly threaded aperture 114 therein. A plug 116 is disposed in aperture 114 to enclose a soil conditioner 100 within the capsular container 110. With regard to the embodiment of the capsular container 110 either of two cross sectional shapes can be utilized. In FIG. 12 there is depicted a capsular container 110 having an elongated tetrahedral shape. In FIG. 13 is illustrated a capsular container 111 having four triangular shaped sides and a parallelogram shaped rear surface.

Figure 14:
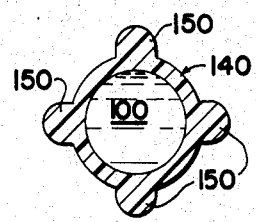
FIG. 14 is a transverse cross sectional view taken on line 14—14 of FIG. 15 of still another specific embodiment of the cartridge means of my invention showing reinforcing ridges thereon.
Figure 14:
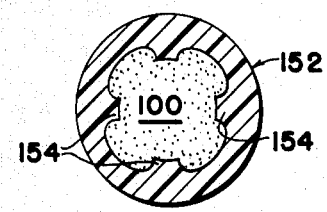
Figure 15:
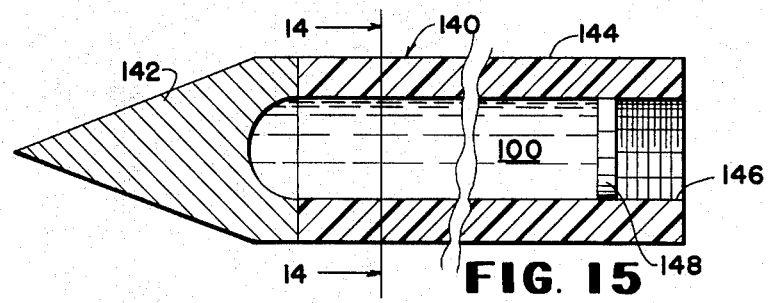
FIG. 15 is a longitudinal view in cross section of the embodiment depicted in FIG. 14.

In FIGS. 14 and 15 is shown still another specific embodiment of my soil conditioning means. The soil conditioning means is a hollow water soluble capsular container 140 of polyvinyl alcohol resin. The capsular container 140 has a conical shaped tip portion 142 joined at its base to a cylindrically shaped portion 144. The cylindrical portion 144 is preferably of polyvinyl alcohol resin and the conical shaped tip portion 142 is preferably of a very strong sturdy material such as metal, ceramic, plastic, etc. Threads 146 are disposed on the interior end portion of the cylindrical shaped portion 144 opposite tip portion 142. A plug means 148 is frictionally engaged in the end to seal soil conditioning compound 100 within the capsular container. A plurality of longitudinally extending fins 150 are arranged on the outside of the cylindrical portion 144 to strengthen the walls of same and also lend directional stability as it is being inserted into the soil. The number of fins 150 can be varied. I have found that a cartridge having longitudinal fins positioned side by side to be very strong and sturdy. The cross sectional shape of the fins can be varied. I have found that a fin having a triangular cross section to be very desirable, and in particular if a plurality of such fins are positioned side by side. The cartridge can also be made entirely of the resin mixture. In FIG. 14A is depicted still another embodiment of the invention which has a capsular container 152 having longitudinally extending ribs 154 on the inside of cylindrical portion. The ribs 154 strengthen the walls of the container adapting it to be inserted into hard packed soil and also provide thickened portions which take longer to dissolve when exposed to moisture to thereby enable the capsular container to retain its shape and identity.

Figure 17:
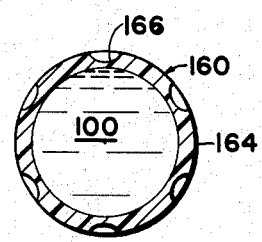
FIG. 17 is a view taken on line 17—17 of FIG. 16.
Figure 16:
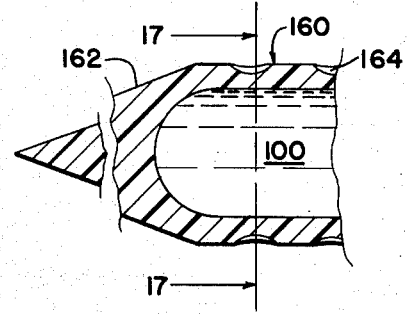
FIG. 16 is a partial longitudinal view in cross section of another embodiment of the new cartridge means of my invention.

Still another specific embodiment of the invention is a capsular container 160 depicted in FIGS. 16 and 17 of the drawings. The capsular container 160 has a solid conical shaped front portion 162, a generally cylindrically shaped rear portion 164 joined to the conical shaped front portion 162, and soil conditioning material 100 disposed therein. The end of capsular container 160 is also closed with a plug means or other suitable means. As illustrated, the cylindrical portion 164 is provided with a plurality of dimples 166 on the exterior surface thereof. The dimples provide a wall having relatively thinner portions which when exposed to moisture are the first to result in an opening. By providing the proper number of dimples the rate at which the fertilizer or other soil conditioning compound can be released is controllable. The major portion of the capsular container namely the thickened wall portions maintains its shape and identity thereby protecting the soil conditioning means enclosed therein from very rapid dispersion thereof. If desired the dimples 166 can be positioned on the inside wall of the cylindrical portion of the container. Furthermore, if necessary or desirable the shape of the container can be modified and is not restricted to a cylindrical shape.

Figure 18:
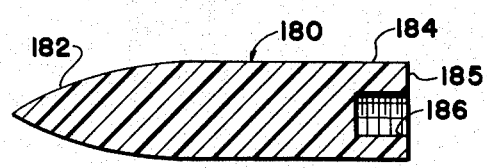
FIG. 18 is a longitudinal view in cross section of still another embodiment of my invention.

Still another specific embodiment of my invention is depicted in FIG. 18. FIG. 18 depicts solid element or pellet 180 having a pointed front end 182, and a cylindrical shaped rear end 184 having a flat rear end surface 185. A suitable coupling means is provided in the rear end surface 185, preferably a threaded aperture 186 as shown. The element or pellet 180 is preferably made up of a soluble mixture of polyvinyl alcohol and a soil conditioning compound. This soil conditioning means is adapted to be inserted into the soil to subsequently dissolve. Upon dissolving the soil conditioning compound is released as the polyvinyl alcohol protecting it is dissolved. The rate at which the soil conditioning compound can be dispersed is directly related to the solubility of the polyvinyl alcohol. The solubility of the polyvinyl alcohol or other suitable material can be controlled by the degree of hydrolysis, the molecular weight of the parent compound, etc.

A specific embodiment of the new soil conditioning method is a method of fertilizing. My new method of fertilizing involves encapsulating fertilizer in a water soluble container of polyvinyl alcohol resin, preferably being obtained from a hydrolysis of polyvinyl acetate which is 25 to 100 percent complete, most preferably 62 to 90 percent complete, and affixing the container to an elongated insertion rod. The container is then forced into the soil with the rod as indicated in FIG. 1. The insertion can be accomplished by either pushing, pounding, drilling, etc. The rod is then removed from the container leaving the container embedded in the soil. If necessary or desirable the container can be dropped into a hole previously formed in the soil, or forced into the soil by hand without a rod. Upon coming into contact with moisture the container will dissolve thereby releasing the fertilizer contained therein. The polyvinyl alcohol resin will also have a texturing effect on the soil.

The method of soil conditioning can be adapted to dispersing a great number of compounds, as for example, lime, various types of fertilizer, iron, carbon black, elements or in general any element necessary or desirable for plant life. The soil conditioning compounds can be in liquid, granular, or solid form. The method can also be utilized to control termites in the area adjacent to buildings, etc. With my new soil conditioning means the protection can be extended over long periods of time. For example, various types of capsular containers containing pesticides can be simultaneously inserted into the ground. The containers have different wall thicknesses and/or are formed of materials which dissolve at different rates. Thereby, a series of containers can be used whereby each will dissolve to release the pesticide at a different time. A container can be produced in accordance with my invention which will retain the pesticide over long periods of time. Various types and sizes of containers containing pesticides can be inserted which will dissolve at predetermined intervals to continually disperse termite control means periodically. The same concept can be applied to any of the other soil conditioning compounds listed.

While I have described and illustrated preferred specific embodiments of my invention, it is to be understood that the soil conditioning means and method and elements thereof disclosed can be made in other forms than herein described or sugggested without departing from the spirit of my invention.

I claim:

1. A sub-soil fertilizer applicator to controllably dispense fertilizer comprising, a longitudinally symmetrical, hollow water soluble, capsular container of polyvinyl alcohol resin, said resin produced by the hydrolysis of polyvinyl acetate, which hydrolysis is in the range of 62 to 90 percent complete, a conical-shaped forward end portion, a slightly bulged central portion, and a rear portion having a progressively decreasing diameter, a flat rear end surface having a central aperture and a concentrically positioned annular depression, a hollow conical-shaped steel tip element disposed over said forward end portion, and a plug disposed in said aperture in frictional engagement therewith, water soluble fertilizer disposed within said capsular container, an insertion rod for forcing said capsular container into the soil having a flat end surface, and an annular shaped protrusion thereon complementary in shape to said annular depression in said rear end surface of said capsular container, and adapted to provide a frictional locking engagement therebetween, said capsular container in use affixed to said rod and inserted into the sub-soil to subsequently dissolve upon coming in contact with moisture to controllably dispense said water soluble fertilizer.

2. A soil conditioning apparatus combination comprising, a hollow water soluble capsular container of polyvinyl alcohol resin derived from a partial hydrolysis of polyvinyl acetate, said capsular container having a shape symmetrical about a longitudinal axis, with a sharp pointed forward end portion, a central portion having a major diameter and a rear portion having an average diameter less than said major diameter, a flat rear end wall on said rear portion having a central aperture, a plug disposed in said aperture in frictional engagement therewith, and a means to couple an insertion rod thereto, water soluble soil conditioner disposed within said hollow capsular container, and an elongated insertion rod, a means on said rod adapted to releasably engage said means to couple on said rear portion of said capsular container, said capsular container in use affixed to said rod and inserted into the sub-soil to subsequently dissolve upon coming in contact with moisture to thereafter controllably disperse said soil conditioner.

3. The soil conditioner apparatus combination of claim 2 wherein said means to couple on said rear portion of said capsular container is a longitudinally extending frusto-conical shaped, enlarged bore concentric with said central aperture, and said rod is provided with a flared end portion complementary in shape to said bore and insertable in same.

4. The soil conditioning apparatus combination of claim 2 wherein the coupling means on said capsular container is a thickened rear wall portion having thread means on said central aperture, and said rod is provided with a longitudinally extending protrusion having threads thereon adapted to releasably engage said thread means in said central aperture.

5. A soil conditioning apparatus combination comprising, a hollow water soluble capsular container of polyvinyl alcohol resin produced by the hydrolysis of polyvinyl acetate, said capsular container having a shape symmetrical about a longitudinal axis with a sharp pointed forward end portion, a central portion having a progressively increasing diameter, and a rear end portion, a longitudinally extending aperture in said rear end portion, a plug means disposed in said aperture in frictional engagement therewith, the wall of said capsular container being relatively thick in the forward portion, progressively thinner in the central portion and progressively thicker in the rear portion, a longitudinally extending annular, tapered projecting wall means on the rear portion of said capsular container, soluble soil conditioner disposed in said capsular container, an insertion rod having a longitudinally extending protrusion thereon complementary in shape to the interior of said projecting wall means, and a cylindrical sleeve disposed about same adapted to engage the exterior surface of said projecting wall means, said protrusion and cylindrical sleeve adapted to form a coupling means with said projecting wall means on said capsular container, said capsular container in use adapted to be affixed to said insertion rod and forced into the sub-soil to subsequently dissolve upon coming in contact with moisture to controllably disperse said soil conditioner.

References Cited by the Examiner
UNITED STATES PATENTS

| | | | |
|---|---|---|---|
| 1,948,117 | 2/1934 | Kadow | 47—48.5 |
| 2,032,608 | 3/1936 | Antrim | 47—48.5 |
| 2,082,712 | 6/1937 | McIvor. | |
| 2,380,721 | 7/1945 | Brigden | 47—48.5 |
| 2,648,165 | 8/1953 | Nestor | 47—56 |
| 2,931,140 | 4/1960 | Laffler et al. | 47—48.5 |
| 3,057,713 | 10/1962 | Gessler. | |
| 3,060,012 | 10/1962 | Pauek | 47—48.5 X |

ABRAHAM G. STONE, *Primary Examiner.*

WILLIAM A. SMITH, III, *Examiner.*